(12) United States Patent
Agarwal et al.

(10) Patent No.: US 12,242,386 B2
(45) Date of Patent: Mar. 4, 2025

(54) EFFICIENT LOGICAL TO PHYSICAL MAPPING UPDATES

(71) Applicant: Western Digital Technologies, Inc., San Jose, CA (US)

(72) Inventors: Dinesh Kumar Agarwal, Bangalore (IN); Leeladhar Agarwal, Rajasthan (IN); Lawrence Vazhapully Jacob, Folsom, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/316,664

(22) Filed: May 12, 2023

(65) Prior Publication Data

US 2023/0385200 A1 Nov. 30, 2023

Related U.S. Application Data

(60) Provisional application No. 63/346,250, filed on May 26, 2022.

(51) Int. Cl.
*G06F 12/10* (2016.01)
*G06F 12/0804* (2016.01)
*G06F 12/1009* (2016.01)

(52) U.S. Cl.
CPC ...... *G06F 12/1009* (2013.01); *G06F 12/0804* (2013.01); *G06F 2212/1021* (2013.01)

(58) Field of Classification Search
CPC ............ G06F 12/1009; G06F 12/0804; G06F 12/0238; G06F 12/0868; G06F 2212/1016; G06F 2212/1021; G06F 2212/214; G06F 2212/263; G06F 2212/313; G06F 2212/466; G06F 2212/7201; G06F 2212/7204; G06F 2212/7207; G06F 2212/7208; G06F 11/1048; G06F 11/1076; G06F 3/06
See application file for complete search history.

(56) References Cited

U.S. PATENT DOCUMENTS

| 8,250,333 | B2 | 8/2012 | Gorobets et al. |
| 10,152,422 | B1 * | 12/2018 | Sampathkumar ... G06F 12/0246 |
| 10,359,955 | B2 | 7/2019 | Inbar et al. |
| 10,452,558 | B2 | 10/2019 | Genshaft et al. |
| 10,459,636 | B2 | 10/2019 | Frid et al. |

(Continued)

*Primary Examiner* — Khoa D Doan
(74) *Attorney, Agent, or Firm* — Rutan & Tucker LLP; Ravi Mohan; Hani Z. Sayed

(57) ABSTRACT

Various devices, such as storage devices or systems are configured to efficiently process and update logical mappings within control table sets. Control table sets are often groupings of logical mapping corresponding to the logical locations of data requested by a host-computing device and the physical locations of the data within the memory array. As data is written and erased, these mappings must be updated within the control table set. Received changes to these mappings are typically stored and updated in two locations: a cache memory and a control table update list. By tracking and marking various control table sets as dirty or having undergone multiple changes, additional received updates can be stored and updated in only the cache memory, bypassing the second control table change list. By only utilizing one method of updating control table sets, processing overhead is reduced and various read or write activities are more efficiently done.

20 Claims, 5 Drawing Sheets

(56) References Cited

U.S. PATENT DOCUMENTS

| | | |
|---|---|---|
| 10,628,326 B2 | 4/2020 | Haswell |
| 11,199,983 B2 | 12/2021 | Frid et al. |
| 2022/0138096 A1* | 5/2022 | Kang .................. G06F 12/0884 711/154 |
| 2023/0048104 A1* | 2/2023 | Bolisetty ............. G06F 12/1009 |

* cited by examiner

EFFICIENT LOGICAL TO PHYSICAL MAPPING UPDATES

PRIORITY

This application claims the benefit of and priority to U.S. Provisional Application No. 63/346,250, filed May 26, 2022, which is incorporated in its entirety herein.

FIELD

The present disclosure relates to storage systems. More particularly, the present disclosure relates to increasing data transfer speeds within a storage device by efficiently updating control table sets comprising logical to physical mapping data.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency.

Storage devices receive and process large numbers of requests from host-computing devices. The logical addresses requested by the host-computing device most often do not equate directly to the physical location of the data within the memory array of the storage device. Hence, most storage devices utilize logical to physical mappings, or control tables, to write and retrieve data. These mappings can be grouped together into control table sets and stored as fixed sizes of data to be accessed when required.

However, as data is moved around, added, or deleted from the storage device, the control table sets must also be updated. Often, a separate memory is utilized to store these updates (or "deltas"). This memory can operate as a control table change list that indicates what changes need to be performed on a particular control table set in order to make it up to date with the actual, current conditions.

Additionally, a control table cache may be utilized to load one or more control table sets into quickly accessible memory devices. In certain scenarios, it may be more efficient to apply any newly received updates to the control table set while it is directly accessible in the control table cache. However, any changes still residing in the control table change list may also need to be applied to make the control table set current. Updating both the control table change lists and the control table sets within the control table cache can tax a processor resident in the storage device as two separate locations are required to be updated.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
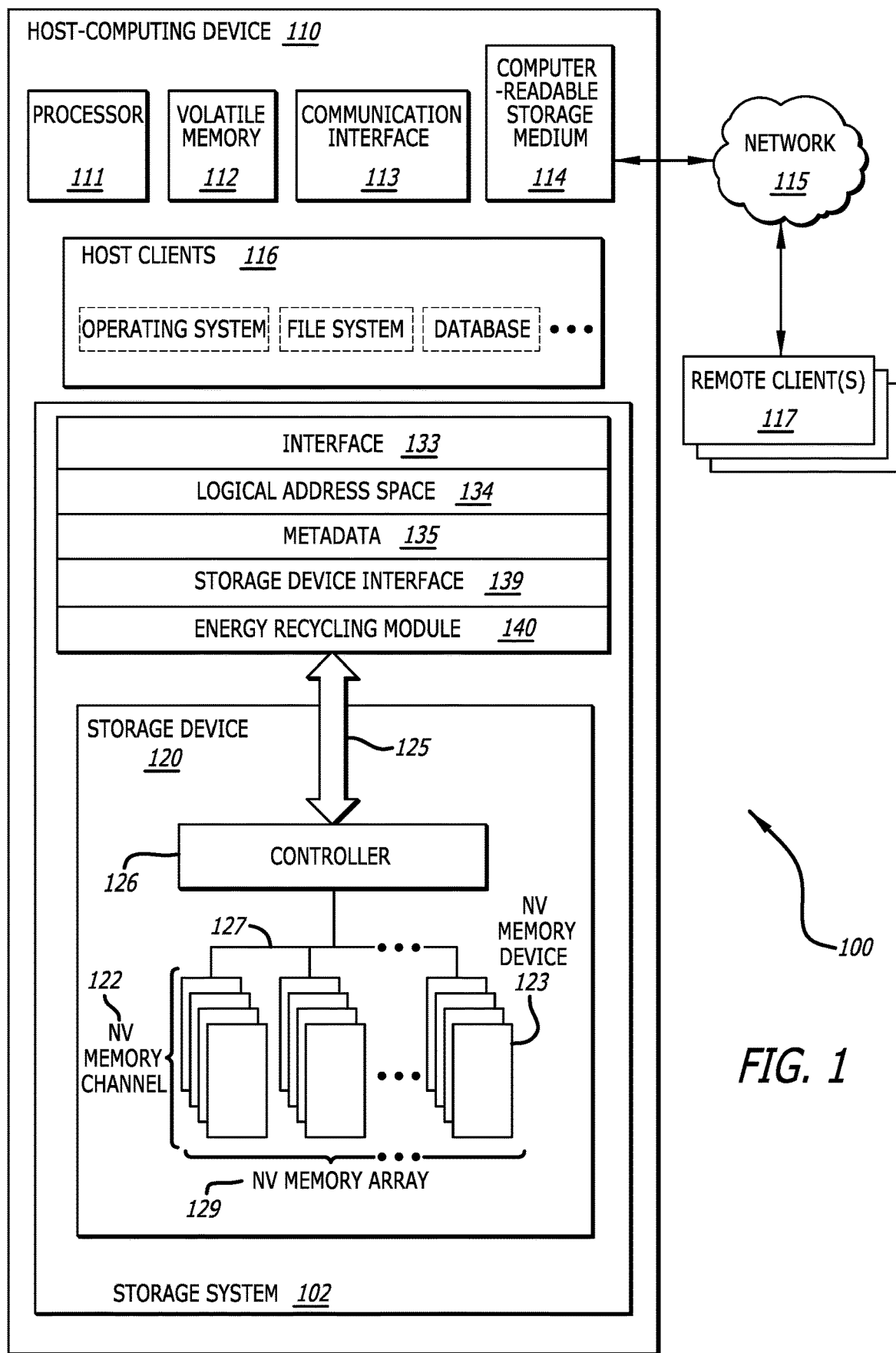
FIG. 1 is a schematic block diagram of a host-computing device with a storage system suitable for control table set management in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that can efficiently manage and update logical to physical mapping data within control data sets by limiting updates to only occur at one location for particular control table sets. With the increasing random/sequential performance with each generation of storage device and other related memory products, maintaining of changes within the control table change lists (which is the second copy if the updates are already available in in the control tables within the control table cache). This dual process of updates put a lot of stress on CPU or processor bandwidth as well as affecting the write performance by taking a significant portion of the processing bandwidth. In many embodiments, by limiting the updates to just occur on control table sets located within a control table cache, processor bandwidth utilization can be reduced.

Additionally, in a variety of embodiments, during regular (or graceful) shutdowns, all of the changes within the control table change lists that have accumulated during use must be applied to the control table sets or retained for future application. In these situations, new memory must be allocated to store the control table change lists for each control table set within the change list. However, by configuring control table sets to be updated only within cache memory, various control table sets can be flushed during the shutdown process. This can lead to a faster shutdown time, and fewer processing requirements when restarting operations as the control table change list does not need to be loaded into memory and associated with the control table set. This flushing process can also occur in response to a predetermined number of changes accumulating within each control table set or other memory portion. In this way, once flushing occurs, the control table change list can be deleted until needed again.

In a number of embodiments, the determination of when to apply these efficient update management operations to various control table sets can be accomplished by marking a set as dirty. In short, as changes/updates are received for each control table set, the original copy of the control table set resembles actual conditions less and less. After a predetermined threshold (usually a particular number of accumulated updates) is exceeded, the control table set can be marked as "dirty" an undergo various associated operations. For example, once marked dirty, a control table set can have any outstanding changes within the control table change list applied to the control table set and future incoming changes being applied directly to the control table set instead of the control table change list.

In many embodiments, the control table set being updated is stored in a control table cache. Certain steps and operations may be limited to only operate on control table sets that are currently within a control table cache. This may allow for operations to be more optimized compared to updating and applying changes in a control table change list. Furthermore, control table sets in cache can be marked as dirty and flushed when needed to regain a "non-dirty" status once the updated control table set has been stored back into long-term memory.

By utilizing these methods of bypassing the use of control table change lists in certain scenarios, processor overhead can be reduced as fewer processing operations are needed. Additional improvements in various read and/or write operations can also be realized. For example, burst random and sequential write performance can be noticeably improved.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system suitable for control table set management in accordance with an embodiment of the disclosure is shown. The control table set management system 100 may comprise one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

The storage system 102 may also include an energy recycling module 140. In various embodiments, the energy recycling module 140 may be disposed within a storage system, such as the embodiment depicted in FIG. 1. However, it is contemplated that many embodiments comprise at least one energy recycling module 140 disposed within the storage device 120 itself. As described in further detail below, the energy recycling module can be configured to capture excess heat and generate electricity that can be stored or utilized to power other components within the storage device 120 and/or storage system 102. The energy recycling module 140 may also be configured to operate in a cooling mode that can receive a power supply and cool one or more surfaces of various components within the storage device 120 or storage system 102. It should also be noted that the energy recycling module 140 may be similar to the energy recycling modules discussed throughout this disclosure such as those described in FIGS. 2-10.

Figure 2:
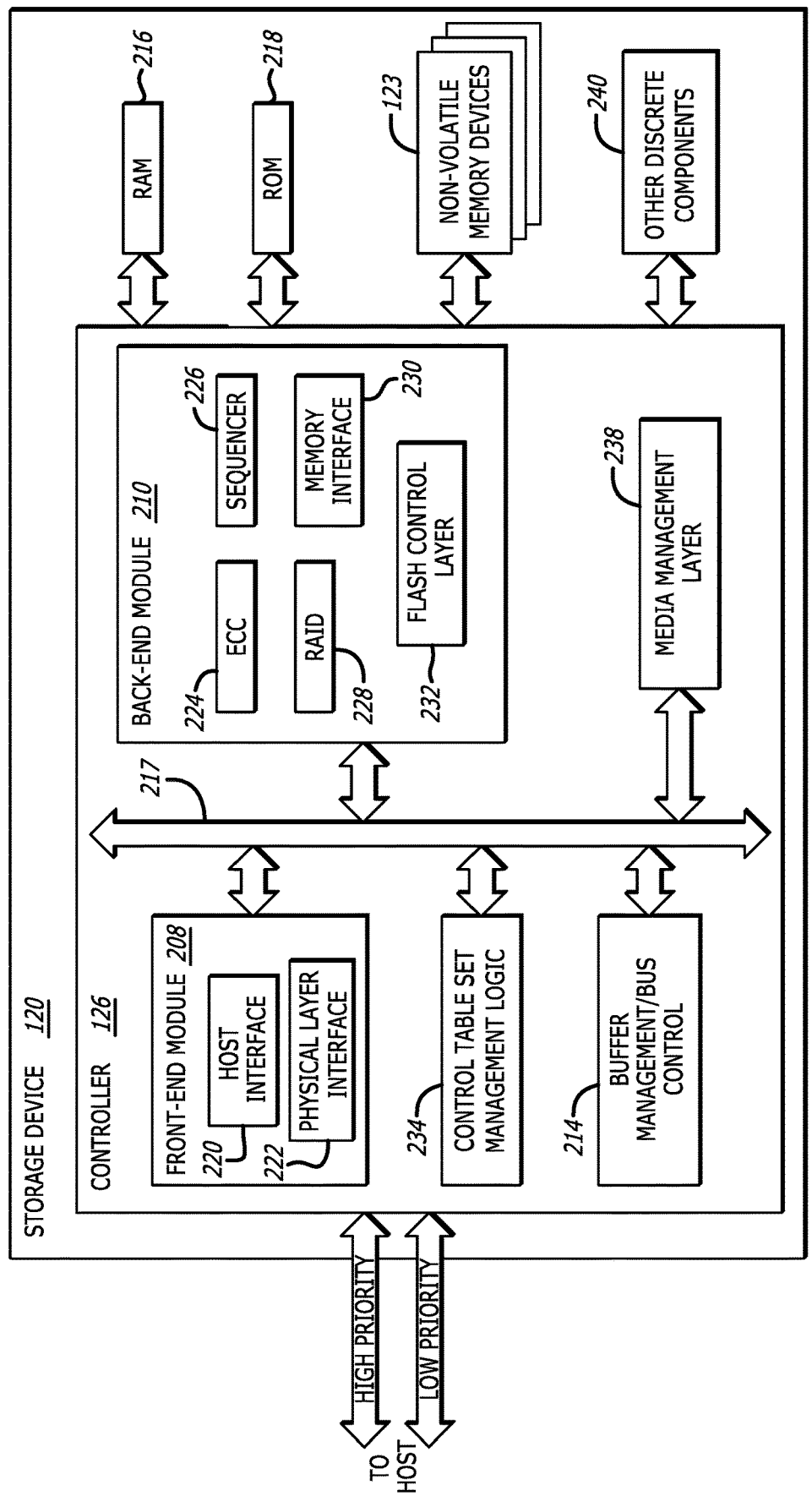
FIG. 2 is a schematic block diagram of a storage device suitable for control table set management in accordance with an embodiment of the disclosure.

Referring to FIG. 2, a schematic block diagram of a storage device 120 suitable for control table set management in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Example types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as energy recycling modules, external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a control table set management logic 234. In many embodiments, the control table set management logic 234 can be configured to monitor the state of control table sets within the storage device 120. For example, the control table set management logic 234 may configure and operate the control table cache and/or the control table change lists. The control table set management logic 234 can direct which control table sets should be transferred into and out of the control table cache. Likewise, the control table change lists can be allocated, managed, and deleted by the control table set management logic 234. In additional embodiments, the control table set management logic 234 can mark and unmark various control table sets as "dirty" which can indicate when certain actions, operations, or other processes should occur to that control table set. Finally, the control table set management logic 234 may also operate to configure one or more various thresholds and/or counters such as, but not limited to, a dirty threshold counter, a flushing counter, etc.

Figure 3:
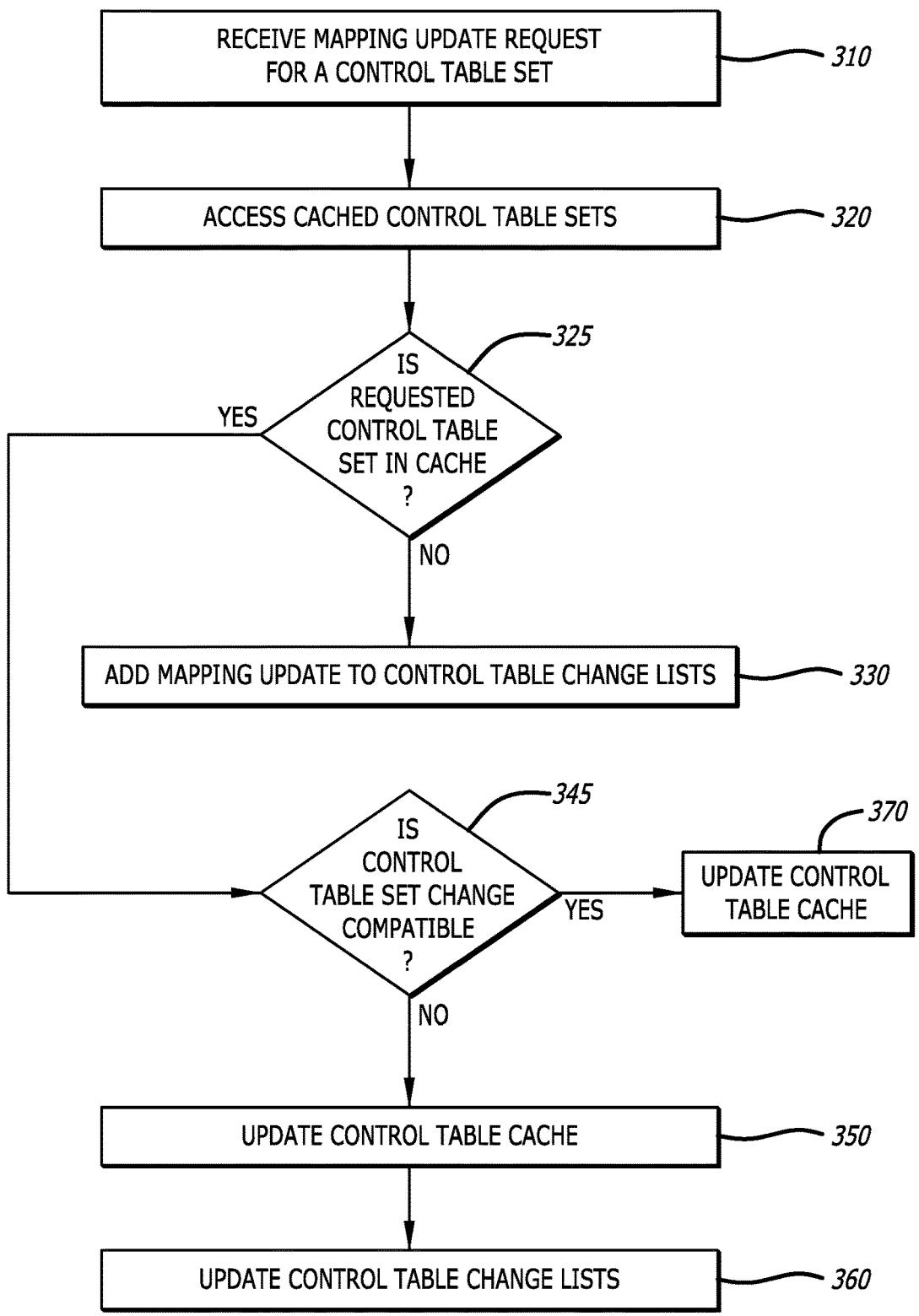
FIG. 3 is a flowchart depicting a process for managing updates for control table sets in accordance with an embodiment of the disclosure.

Referring to FIG. 3, a flowchart depicting a process 300 for managing updates for control table sets in accordance with an embodiment of the disclosure is shown. In many embodiments, the process 300 can first receive a mapping update request for a control table set (block 310). Often, these update requests are related to changes in the mappings of the control table set corresponding to data that was written or erased within the storage device. Once received, the process 300 can access the cached control table sets (block 320). This is typically done in one or more control table caches, but can be located in any suitable memory.

Next, the process 300 can determine if the requested control table set is in the accessed cache (block 325). In a variety of embodiments, if the requested control table set is not in the accessed cache, the process 300 can then add the mapping update to the control table change list(s) (block 330). In certain embodiments, the process 300 may attempt to search another cache for the requested control table set. However, when the requested control table set is found in the accessed cache, the process can then determine if the control table set change request is compatible (block 345). In various embodiments, a change request can be in different forms. The request may be due to a sequential data write, a block erase, and/or a random write process. Various types of change requests are compatible with the efficient update process. Certain types of requests are not compatible and may require updating changes in both the control table cache and the control table change lists as the benefits of avoiding updating the control table change lists are negated by the change request's incompatibility (i.e., the processing required to complete the change request).

If the change request is compatible, the process 300 simply update the control table cache to reflect the requested update (block 370). However, when the change request is not compatible, the process 300 can then first update the control table cache (block 350). Then, the process can additionally update the control table change list(s) (block 360). A more detailed description of determining and marking compatibility and segregating various control table sets is described below.

Figure 4:
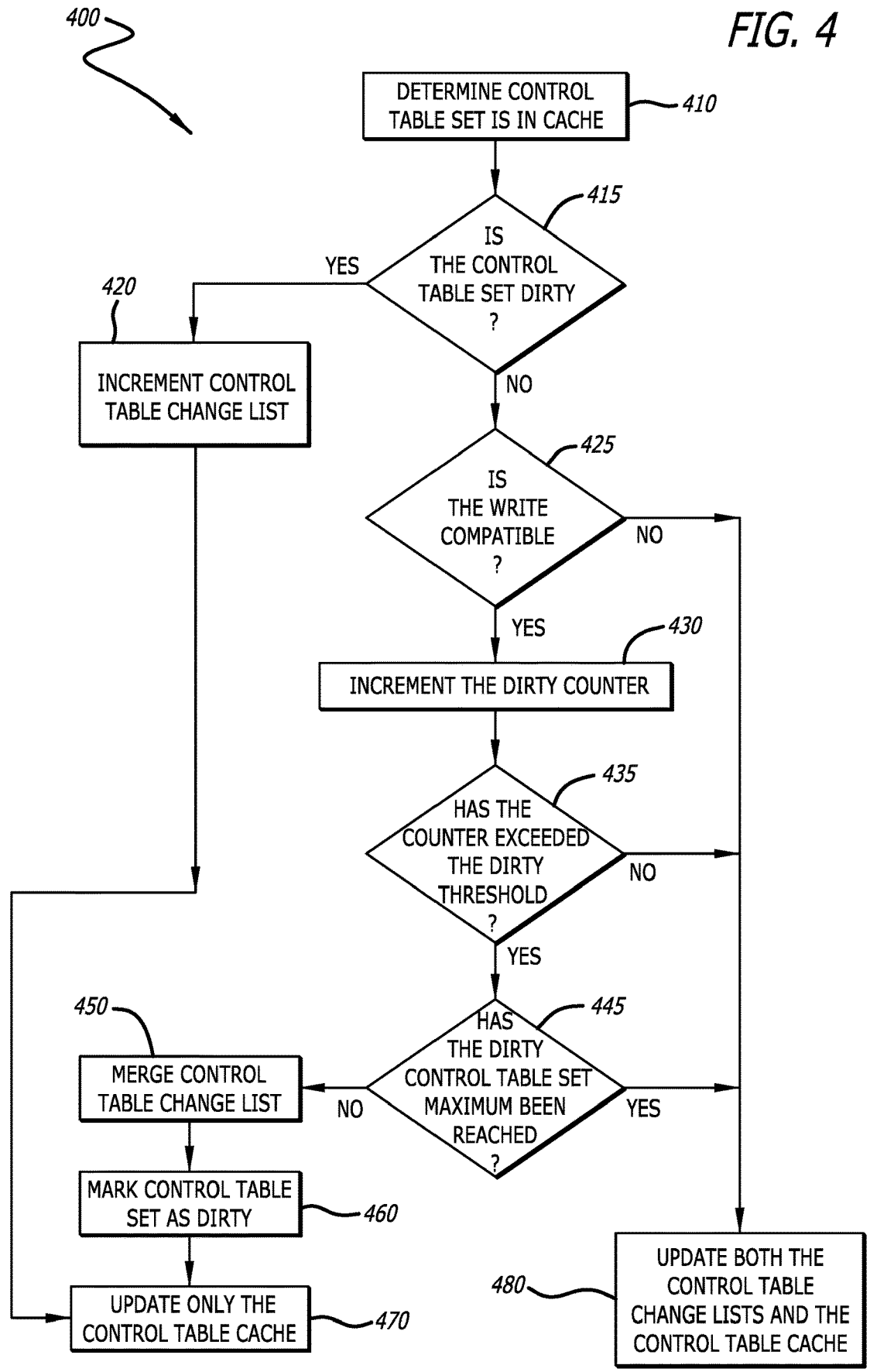
FIG. 4 is a flowchart depicting a process for marking dirty control table sets in accordance with an embodiment of the disclosure.

Referring to FIG. 4, a flowchart depicting a process 400 for marking dirty control table sets in accordance with an embodiment of the disclosure is shown. Similar to the process 300 in FIG. 3, the process 400 can determine if a control table set is in a cache memory (block 410). Once found, the control table set can be analyzed to determine if it is dirty (block 415). If the block is dirty, the process 400 can increment a control table change list associated with that control table set (block 420). In many embodiments, the incrementation is for a skip counter. Finally, the process 400 can update only the control table cache (block 470). Specifically, various embodiments can update the control table set that resides in the control table cache.

However, when the control table set is not dirty, the process 400 can determine if the requested change or write is compatible (block 425). As discussed above with respect to FIG. 3, various changes can be compatible with the methods described herein. If the change is not compatible, then the process 400 can update both the control table change lists and the control table cache as needed (block 480). When the requested change is compatible, the process 400 can increment a dirty counter (block 430). The dirty counter can be an incremental counter that is associated with each control table set and is associated with the number of changes that have occurred within the control table set.

The process 400 can determine if the incremented dirty counter exceeds a predetermined dirty threshold (block 435). The dirty threshold can be configured as a maximum number of changes that can occur to each of the control table changes before more efficient methods of updating should be applied. When the control table set has not yet exceeded the dirty threshold, then the process 400 can update both the control table change lists and the control table cache as usual (block 480).

However, when the dirty threshold has been exceeded, the process 400 can determine if the maximum number of dirty control sets has been reached (block 445). In a number of embodiments, the storage device, or processing unit can only accommodate a particular number of dirty control table sets before inefficiencies if processing them occur. In response, when the maximum number of dirty sets has already been reached, the process 400 can still update both the control table change lists and the control table cache (block 480). In certain embodiments, once the maximum number of dirty control table sets has been reached, a flushing operation may occur to remove one or more dirty control table sets from the control table cache. A more detailed explanation of the flushing operations is described below in FIG. 5.

When the maximum number of dirty control table sets has not been reached, the process 400 can merge the control table change lists (block 450). In many embodiments, merging the control table change lists include applying all changes stored within the control table change lists to the corresponding control table set under review within the process 400. Additionally, the process 400 can market the control table set as dirty (block 460) which can bypass certain operations in the future and avoid updating the control table change lists until the control table set has been flushed. Finally, the process 400 can update only the control table cache and the control table set within (block 470).

Figure 5:
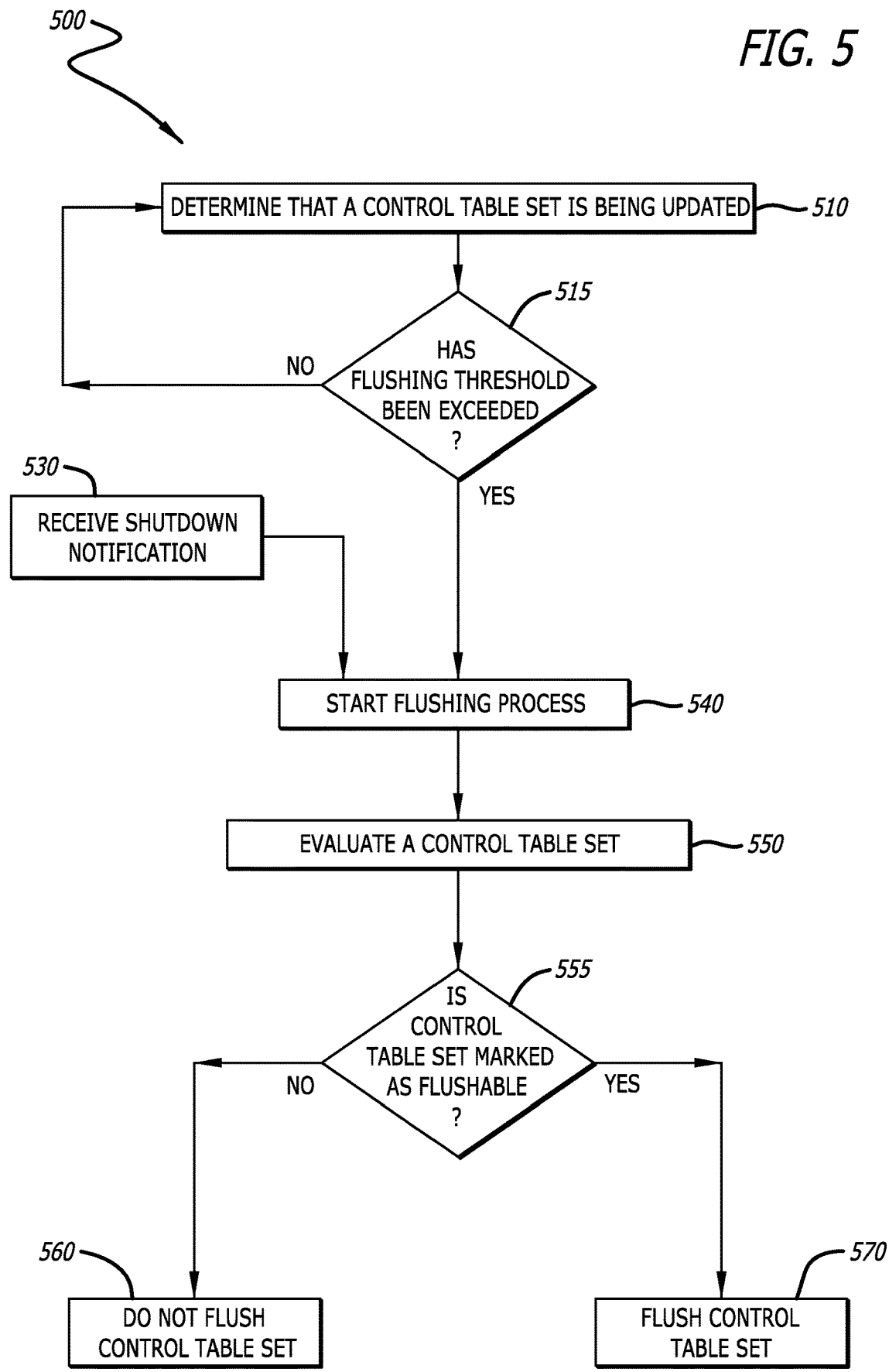
FIG. 5 is a flowchart depicting a process for flushing control table sets in accordance with an embodiment of the disclosure.

Referring to FIG. 5, a flowchart depicting a process 500 for flushing control table sets in accordance with an embodiment of the disclosure is shown. The process 500 can begin when it is determined that a control table set is being updated (block 510). When the control table set is being updated, it is undergoing various processes such as those discussed above with respect to FIGS. 3 and 4. Many embodiments are configured with a maximum number of changes that may occur over the entire control table sets before a flush should occur. The process 500 can determine if the flushing threshold has been exceeded (block 515). If the flushing threshold has not been exceeded, the process 500 can wait until it is again determined that a control table set has been updated (block 510). Additionally, each time the control table set is updated, it may exceed or be marked as a "flushable" control table set. This status can be managed by a logic or other counter associated with the control table set, which can be separate from a dirty counter or other designation.

When the flushing threshold has been exceeded, the process 500 can start a flushing process (block 540). In various other embodiments, the storage device may receive a shutdown notification (block 530). In these instances, the process 500 may also begin a flushing process (block 540). The process 500 may then prepare to evaluate a plurality of control table sets (block 550). When a control table set is evaluated, it can be determined if the control table set is marked as flushable or not (block 555). As discussed above, the determination of being flushable can be based on or associated with a dirty status of the control table set. However, in certain embodiments, there may be a separate counter or designation for being flushable. If the control table set is not marked as flushable, the process 500 will not flush the control table set (block 560). Conversely, if the control table set is determined to be flushable, then the process 500 can flush the control table set (block 570).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising a plurality of components, including:
   a processor;
   a memory array comprising a plurality of memory devices wherein a portion of the memory devices are utilized as cache memory devices;
   a plurality of control table sets configured to be stored in cache memory devices or non-cache memory devices; and
   a control table set management logic configured to:
   receive an update request for a control table set;
   access the requested control table set;
   determine if the requested control table set is stored within cache memory devices;
   determine, in response to the requested control table set being stored in cache memory devices, if the update is compatible; and
   updating, in response to the update being compatible, the control table set within the cache memory devices.

2. The device of claim 1, wherein determination of whether an update is compatible comprises evaluating the specific type of update.

3. The device of claim 2, wherein the type of update may include a sequential write stream or a burst random write.

4. The device of claim 1, wherein the control table sets comprise logical to physical mapping data.

5. The device of claim 1, wherein the device further comprises a control table change list configured to store one or more changes to be applied to the control table set stored within the cache memory devices.

6. The device of claim 5, wherein the control table change list is not updated in response to the update being compatible.

7. A method of reducing processor usage during update processes, comprising:
   receiving an update request for a control table set;
   determining that the requested control table set is in cache memory;
   analyzing, in response to the control table set being in cache memory, if the control table set is dirty;
   incrementing, in response to the control table set being dirty, a counter within a control table change list; and
   updating only a control table cache memory.

8. The method of claim 7, wherein a control table set can be classified as dirty in response to a counter associated with the control set table exceeding a predetermined threshold.

9. The method of claim 8, wherein the predetermined threshold is associated with previous update requests associated with the control set table.

10. A method of reducing processor usage during update processes, comprising:
    receiving an update request for a control table set;
    determining that the requested control table set is in cache memory;
    analyzing, in response to the control table set being in cache memory, if the control table set is dirty;
    verifying, in response to the control table set not being dirty, if the received update request is compatible;
    incrementing, in response to the update request being compatible, a dirty threshold counter;
    comparing the dirty threshold counter to a predetermined threshold;
    merging, in response to the dirty threshold exceeding the dirty threshold, data within a control table change list and the cache memory;
    marking the control table set as dirty; and
    updating only a control table cache memory.

11. The method of claim 10, wherein a control table set can be classified as dirty in response to a counter associated with the control set table exceeding a predetermined threshold.

12. The method of claim 11, wherein the predetermined threshold is associated with previous update requests associated with the control set table.

13. The method of claim 10, wherein verifying compatibility comprises evaluating the specific type of update request.

14. The device of claim 13, wherein the type of update request may include a sequential write stream or a burst random write.

15. The device of claim 10, wherein the control table change list is configured to store one or more changes to be applied to the control table set stored within the cache memory devices.

16. The device of claim 15, wherein the control table change list is not updated in response to the update being compatible.

17. The method of claim 10, wherein merging the control table change list comprises applying each of the changes described in the control table change list to the corresponding control table set.

18. The method of claim 10, wherein the method further includes:
- incrementing, in response to receiving an update request for a control table set, a flushable counter associated with the control table set;
- receiving a shutdown notification;
- comparing the flushable counter to a predetermined flushing threshold; and
- flushing, in response to the flushable counter exceeding the predetermined flushing threshold, the control table set.

19. The device of claim 18, wherein incrementing the flushable counter associated with the control set is done in response to a control table set being updated.

20. The method of claim 18, wherein the method further includes marking the control table set as not dirty upon completion of the flushing.

* * * * *